United States Patent [19]

Norris

[11] 4,005,228

[45] Jan. 25, 1977

[54] MILK FAT CONTAINING PRODUCTS AND PROCESSES THEREFOR

[76] Inventor: Robert Norris, Private Bag, Palmerston North, New Zealand

[22] Filed: Sept. 30, 1974

[21] Appl. No.: 510,626

[52] U.S. Cl. .............................. 426/586; 426/603; 426/613; 426/429; 426/495
[51] Int. Cl.² .................. A23D 3/02; A23C 23/00
[58] Field of Search .......... 426/150, 185, 194, 336, 426/356, 491, 495, 417, 530, 581, 603, 663, 664, 429, 586, 613

[56] References Cited

UNITED STATES PATENTS 3,519,435  7/1970  MacCollom .................. 426/336 X

OTHER PUBLICATIONS

Swern, D. "Bailey's Industrial Oil and Fat Products", Interscience Publ. New York 1964, pp. 1011–1012.
Sherbon, J. W. et al. "Prep. and Fractionation of the High Melting Glyceride Fract. of Milk Fat", J. Dairy Sc. vol. 56. pp. 52–60.

*Primary Examiner*—Raymond N. Jones
*Assistant Examiner*—R. A. Yoncoskie
*Attorney, Agent, or Firm*—Holman & Stern

[57] ABSTRACT

A soft dairy spread processed by fractionating milk fat into a number of fractions, each fraction having a suitable melting range and re-combining selected fractions in a product having limited change in solid fat content to give a satisfactory spreading characteristic. A butter is made by taking the product and adding solids not fat, water and salt. The combined fractions do not include the triglycerides which melt over 0° C to 20° C.

12 Claims, No Drawings

MILK FAT CONTAINING PRODUCTS AND PROCESSES THEREFOR

BACKGROUND OF THE INVENTION

This invention relates to milk fat containing products and processes therefor and has been devised particularly though not solely for producing a soft dairy spread.

It is desired that a dairy spread should be available which will be spreadable at domestic refrigerator temperatures say 5° C and which will have little change in its spreading characteristics as between that temperature and a warm ambient temperature; say 22° C.

The most important property of high fat content spreads which determines their spreadability is the solid fat content of the fat phase. The solid fat content of a glyceride mixture is defined as the proportion of solid glycerides present at a given temperature. The solid fat content is conveniently measured by wide line nuclear magnetic resonance spectroscopy. Related measurements such as the so-called solid fat index (American Oil Chemists Society Official Method) or the integral curve obtained by differential scanning calorimetry (Norris and Munro, 1974) are also commonly used. Variation in the solid fat content accounts for more than 50% of the variation in butter hardness and is the principal factor in determining the rheological properties of butterlike products.

SUMMARY OF THE INVENTION

It is therefore an object of the present invention to provide a milk fat containing product and/or processes therefor which product may be easily spread over a wide range of temperatures.

It is another object of the invention to provide a milkfat containing product and/or processes therefor which shows little change in the solid fat content of its fat phase over a wide range of temperatures.

Accordingly in one aspect the invention consists in a process for producing a milkfat containing product said process comprising the steps of fractionating milkfat or a milkfat containing substance into a number of fractions each fraction having a suitable melting range and recombining selected fractions in such proportions as to produce a product having a limited change in solid fat content so as to have little change in spreading characteristic over a desired temperature range.

In a further aspect in a preferred form the invention consists in a method of making a dairy spread or butter comprising the steps of mixing lower melting triglycerides obtained from a milk fat containing product and higher melting triglycerides obtained from a milk fat containing product in suitable proportions and adding to such proportions a desired proportion of non-fat solids and water and salt.

In a still further aspect the invention consists in a milk fat containing product comprising selected fractions of a milk fat which have been combined in such proportions that the finished product has a desired degree of spreadability over a desired range of temperatures.

In a still further aspect in a preferred form the invention consists in a dairy spread or butter comprising a mixture of a lower melting fraction and a higher melting fraction obtained from a milk fat containing product mixed in suitable proportions with desired proportions of non-fat solids and water and salt.

In a more specific aspect of the invention a process is provided for producing a dairy spread made entirely from milkfat which has a plastic range in the 0° to 20° C region. Basically the invention is concerned with the removal from milkfat of those triglycerides which melt over this region. This is preferably carried out by solvent crystallisation of anhydrous milkfat from solution in acetone to produce a series of fractions with different melting ranges. The fraction melting in the 0° to 20° C region is removed and the other fractions are combined in a suitable ratio to produce the fat portion of the dairy spread.

DESCRIPTION OF THE PREFERRED EMBODIMENTS

One preferred form of the invention and modifications thereof will now be described.

In the present invention milk fat or a milk fat containing substance is fractionated into a plurality e.g. at least three fractions:

1. A fraction melting below about 0° C
2. A fraction melting between about 0° and 20° C
3. A fraction or fractions melting entirely above about 20° C.

Fraction 1 is then blended with one of the fractions 3 in suitable proportions and with a desired proportion of water, salt and non-fat solids preferably obtained from milk or milk products resulting in a dairy spread or butter having a substantially similar spreading characteristic between temperatures of say 5° and 22° C i.e. having little change in spreading characteristics within this range.

It may be desirable in some cases to produce more than one fraction melting entirely above 20° C so that the final melting point of the said dairy spread is at or below mouth temperature.

The preferred form of fractionation comprises solvent fractionation of anhydrous milk fat. Solvent fractionation processes may be of several types:

1. liquid extraction, by which the melted fat to be fractionated is contacted with a solvent, e.g. propane or furfural in which only some of the triglycerides are soluble.

2. Leaching by which higher melting glyceride fractions are first crystallised from the melt and organic solvent is added to the slurry and the slurry filtered. The slurry may also be filtered first and the solvent used to wash the higher melting fat crystal aggregates free of lower melting fat.

3. solvent crystallisation, by which a slurry of higher melting fat crystal aggregates in solvent/fat solution is first produced either by mixing hot fat and cold solvent so that the mixture attains the desired crystallisation temperature or by producing an entirely liquid solution of fat in solvent and cooling the solution until the desired crystallisation temperature is reached. The crystal aggregates are then separated from the solution by, for example, decantation, filtration or centrifuging. Washing of the crystal aggregates with fresh or other solvent during or after separation by any of the above methods may be carried out if desired. After further crystallisations on either the filtrate or precipitate at the same or other temperatures are carried out if desired, the solvent may be removed from the fractions by, for example, evaporation and stripping using steam or other gas or vapour. If a scheme for a solvent fractionation involves recrystallisation these further recrystallisations can usually be carried out in any order adding or removing solvent as desired between crystallisations. Substantially pure organic solvents, mixtures of organic solvents, organic solvent plus water, and mixtures of organic solvents plus water may be used. In the present invention the preferred form of solvent fractionation is solvent crystallisation. The solvent used is an organic solvent or mixture of solvents selected from for example propan-2-ol(isopropanol), acetone, ethyl acetate, hexane or petroleum derivatives. Preferably acetone or propan-2-ol is used as solvent using preferably four parts by weight of solvent to one part by weight of fat.

The following are examples of the processes according to the invention.

EXAMPLE 1

40 g of anhydrous milk fat obtained in the spring (softening point (Dolby, 1961) = 32.0; Iodine value = 36.9) was dissolved in 160 g acetone in a 500 ml flat bottomed flask.

The solution was heated to 26.5° C then placed in a water bath at 22° C for 2 hours without stirring. The slurry was then filtered in a jacketed sintered glass funnel. The precipitate was washed on the filter with 8 g of acetone at 22° C and the wash liquor combined with the filtrate. The bulk of the solvent was removed from the precipitate in a rotary vacuum evaporator and the last traces removed by stripping with nitrogen gas. The fat recovered from the precipitate amounted to 0.54 g (fraction 1).

The combined filtrate and washings were heated to 22° C, cooled to 12.0° C in 40 mins, and held at that temperature for 2½ hours. The slurry was filtered and washed with 16 g acetone at 12° C and the wash liquor combined with the filtrate. The precipitate contained 3.15 g fat (fraction II).

The combined filtrate and washings from the 12° C crystallisation were then heated to 20° C and cooled to −14° C in 5 hours and held for 1 hour. After filtration and washing with 80 g acetone at −15° C the precipitate contained 17.5 g of fat (fraction III) and the filtrate plus wash liquor contained 16.6 g (fraction IV). Selected fractions were then recombined in selected proportions and accordingly one part of fat from fraction II was combined with three parts of fat from fraction IV and the thermal properties of the mixture analysed using a Differential Scanning Calorimeter (Norris and Munro, 1974). The results showed that the fat blend contained approximately 46% of solid fat at 5° C and 38% at 22° C, indicating only a small change in solid fat content (consistency) over this temperature range.

The temperatures given in this example may of course be varied to vary the melting points of the fractions. The holding steps may be omitted if desired but are provided to give time for aggregations of crystals to build up.

EXAMPLE 2

1.5 kg of anhydrous milk fat obtained in the summer was dissolved in 6.4 kg anhydrous acetone and placed in a jacketed stainless steel vessel. This vessel consists of an upper and lower chamber. The upper chamber is fitted with a "near wall" paddle and the lower chamber contains a filter medium as its floor. Refrigerant can be circulated through the jacket from a controlled temperature bath. The solution was heated to 33° C and cooled at 24° C/hr to 22° C and held for 70 minutes before being dropped to the lower chamber where the slurry was filtered. The crystals were washed on the filter with 0.4 kg of acetone at 20° C. The precipitate (fraction 1) was removed from the vessel by heating the jacket to 50° C and dissolving the fat in 4 kg of acetone at 50° C. After removal of solvent from the precipitate 0.084 kg of fat remained.

The filtrate plus wash liquor was returned to the top chamber, heated at 30° C, cooled at 17° C/hr to 11.5° C and held for 1 hour before filtration. 0.8 kg of wash liquor at 10° C was used. 0.136 kg of precipitate (fraction II) was produced.

The filtrate from the 12° C crystallisation was returned to the vessel, heated to 22° C, cooled at 16.2° C/hr to −15° C, held for 110 minutes and filtered. After washing with 3.2 kg acetone at −17° C, the precipitate was found to contain 0.534 kg (fraction III) and the filtrate plus washings 0.49 kg (fraction IV).

Fractions II and IV were combined in the ratio of 1:3 by weight, and used to make a butter containing 15.6% moisture, 1.3% salt and 83.1% fat. The butter had a hardness value of 135 by sectility at 5° C (Taylor et al. 1971) and a "stand up" value of 1.3 at 22° C. On the scale used, a spread should have a stand up value of less than 5 units at 22° C to be considered satisfactory. The butter was spreadable on bread at 5° C and appeared to have substantially the same consistency at 22° C.

EXAMPLE 3

1.6 kg of Anhydrous Milkfat obtained in the summer was dissolved in 6.4 kg anhydrous propan-2-ol and placed in the vessel described in example 2. The solution was heated to 36° C, cooled at 6° C/hr to 20° C and held for 1 hour before being dropped to the lower chamber where the slurry was filtered. The crystals were washed on the filter with 1 kg propan-2-ol at 18° C. The precipitate (fraction I) was removed from the vessel by heating the jacket to 50° C and dissolving the fat in 4 kg of propan-2-ol at 50° C. After removal of solvent from the precipitate 0.296 kg of fat remained.

The filtrate plus wash liquor was returned to the top chamber, heated to 33° C, cooled at 20° C/hr to 14° C, held for 15 minutes, cooled at 1° C/hr to 11° C then cooled at 6° C/hr to −5° C at which temperature the slurry produced was held for 1 hour. Slow cooling of not greater than 1° C/hr between the temperatures of 14° C and 11° C was found essential in order to produce good crystals when propan-2-ol was used as solvent for this crystallisation step. After filtration and washing with 2 kg propan-2-ol at −7° C the precipitate was found to contain 0.726 kg of fat (fraction II). The filtrate plus washings were found to contain 0.537 kg of fat (fraction III) fraction 1 was found to melt entirely above 20° C, fraction II between 0° and 20° C, and fraction III entirely below 0° C.

Fractions 1 and III were combined in the ratio 1:3 by weight, and used to make a butter with a hardness value of 180 and a stand up value of 2.0.

I claim:

1. A process for producing a soft dairy spread comprising the steps of
   a. fractionating a milkfat into three fractions, said fractions comprising a first fraction in which substantially all the milk fat is solid at 20° C, said first fraction melting increasingly at higher temperatures, a second fraction in which substantially all the milk fat is solid at 0° C and liquid at 20° C, and a third fraction in which substantially all the milk fat is melted at 0° C; and b. blending said first and third fractions in a ratio of about 1:3 such that the solid fat content of the soft dairy spread remains substantially constant over a temperature range of 5° to 22° C.

2. A process as claimed in claim 1, wherein said steps of fractionation are effected by the use of a solvent.

3. A process as claimed in claim 2, wherein said steps of fractionation are effected by the techniques of solvent crystallization.

4. A process as claimed in claim 3, which includes a separation step selected from decantation, filtration and centrifugation to separate the crystals from the solution.

5. A process as claimed in claim 2, wherein said solvent is an organic solvent selected from the group consisting of propan-2-ol, acetone, ethyl acetate, hexane, petroleum derivatives and mixtures thereof.

6. A process as claimed in claim 1, wherein said fractionating includes the steps of adding a solvent to anhydrous milk fat, heating the solution to a first temperature sufficient to dissolve the milk fat, cooling the solution to a second and lower temperature over a period of time, filtering the solution and removing the solvent so that the precipitate forms said first fraction, heating the filtrate above the second temperature and cooling the filtrate to a third temperature lower than said second temperature over a period of time, filtering the solution at about said third temperature and removing the solvent so that the precipitate forms a second fraction and removing the solvent from the filtrate to form said third fraction.

7. A process as claimed in claim 6, wherein said solvent is an organic solvent selected from the group consisting of acetone, propan-2-ol, ethyl acetate, hexane, petroleum derivatives and mixtures thereof.

8. A process as claimed in claim 6, wherein said solvent is acetone and said solvent is mixed with said milk fat in the ratio of four parts by weight of solvent to one part by weight of milk fat, and wherein the said first, second and third temperatures are respectively about 26°, 11° and −14° C.

9. A process as claimed in claim 6 including the step of holding the solvent-milk fat mixture at one or more of said temperatures.

10. A process as claimed in claim 6, wherein each said precipitate is washed with solvent and the resulting wash liquor is added to the filtrate solution before any next step is carried out thereon.

11. A process as claimed in claim 1, including the step of mixing water, salt and non-fat milk solids with said blended fractions.

12. The product of the process of claim 11.

* * * * *